US012804647B2

(12) United States Patent
Zhang et al.

(10) Patent No.: US 12,804,647 B2
(45) Date of Patent: Nov. 17, 2026

(54) RULES FOR UPLINK CONTROL INFORMATION (UCI) MULTIPLEXING

(71) Applicant: QUALCOMM Incorporated, San Diego, CA (US)

(72) Inventors: Qian Zhang, Basking Ridge, NJ (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1064 days.

(21) Appl. No.: 17/448,034

(22) Filed: Sep. 17, 2021

(65) Prior Publication Data

US 2023/0093125 A1 Mar. 23, 2023

(51) Int. Cl.

| | |
|---|---|
| ***H04W 72/1273*** | (2023.01) |
| ***H04W 72/20*** | (2023.01) |
| ***H04W 72/21*** | (2023.01) |
| ***H04W 72/23*** | (2023.01) |
| ***H04W 80/02*** | (2009.01) |

(52) U.S. Cl.
CPC ....... *H04W 72/1273* (2013.01); *H04W 72/20* (2023.01); *H04W 72/21* (2023.01); *H04W 72/23* (2023.01); *H04W 80/02* (2013.01)

(58) Field of Classification Search
CPC . H04W 72/1273; H04W 72/20; H04W 72/21; H04W 72/23; H04W 80/02
USPC ........................................................ 370/329
See application file for complete search history.

(56) References Cited

U.S. PATENT DOCUMENTS

| | | | | |
|---|---|---|---|---|
| 2013/0301486 A1* | 11/2013 | Kishiyama | H04L 5/14 370/277 |
| 2014/0071935 A1* | 3/2014 | Papasakellariou | H04W 72/23 370/330 |
| 2021/0218519 A1* | 7/2021 | Gou | H04W 72/21 |
| 2021/0274521 A1* | 9/2021 | Yuan | H04L 1/0038 |
| 2022/0104240 A1* | 3/2022 | Yang | H04W 74/08 |

* cited by examiner

*Primary Examiner* — Chi Tang P Cheng
(74) *Attorney, Agent, or Firm* — Patterson+ Sheridan, L.L.P.

(57) ABSTRACT

Certain aspects of the present disclosure provide a technique for determining resources for multiplexing uplink control information (UCI) during a full duplex (FD) operation. In one example, a user equipment (UE) implements the technique to determine resources for multiplexing UCI in a physical uplink shared channel (PUSCH) when resources for the PUSCH at least partially overlaps with resources for a scheduled physical downlink shared channel (PDSCH), and transmit the PUSCH with the UCI multiplexed on the determined resources.

24 Claims, 16 Drawing Sheets

Use Case 2

Use Case 3

| BS | UE | Comments |
|---|---|---|
| FD Disabled | FD Disabled | Baseline Operation |
| FD Disabled | FD Enabled | Use Case 1 for mTRP |
| FD Enabled | FD Disabled | Use Case 2 and IAB |
| FD Enabled | FD Enabled | Use Case 3 |

FIG. 7

Case 1: FD UE + HD BS
Case 2: FD BS + HD UE
Case 3: FD BS + FD UE

RULES FOR UPLINK CONTROL INFORMATION (UCI) MULTIPLEXING

BACKGROUND

Field of the Disclosure

Aspects of the present disclosure relate to wireless communications, and more particularly, to techniques for multiplexing uplink control information (UCI) during a full duplex (FD) operation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques/rules for multiplexing uplink control information (UCI) and/or medium access control (MAC) control elements (CEs) during a full duplex (FD) operation.

Certain aspects of the subject matter described in this disclosure can be implemented in a method for wireless communications by a user equipment (UE). The method generally includes determining resources for multiplexing UCI in a physical uplink shared channel (PUSCH) when resources for the PUSCH at least partially overlaps with resources for a scheduled physical downlink shared channel (PDSCH), and transmitting the PUSCH with the UCI multiplexed on the determined resources.

Certain aspects of the subject matter described in this disclosure can be implemented in an apparatus for wireless communications by a UE. The apparatus generally includes at least one application processor and a memory configured to: determine resources for multiplexing UCI in a PUSCH when resources for the PUSCH at least partially overlaps with resources for a scheduled PDSCH, and transmit the PUSCH with the UCI multiplexed on the determined resources.

Certain aspects of the subject matter described in this disclosure can be implemented in an apparatus for wireless communications by a UE. The apparatus generally includes means for determining resources for multiplexing UCI in a PUSCH when resources for the PUSCH at least partially overlaps with resources for a scheduled PDSCH, and means for transmitting the PUSCH with the UCI multiplexed on the determined resources.

Certain aspects of the subject matter described in this disclosure can be implemented in a computer readable medium storing computer executable code thereon for wireless communications by a UE. The computer readable medium generally includes code for determining resources for multiplexing UCI in a PUSCH when resources for the PUSCH at least partially overlaps with resources for a scheduled PDSCH, and code for transmitting the PUSCH with the UCI multiplexed on the determined resources.

Certain aspects of the subject matter described in this disclosure can be implemented in a method for wireless communications by a network entity. The method generally includes transmitting to a first UE an indication of resources for multiplexing UCI in a PUSCH for the first UE when resources for the PUSCH at least partially overlaps with resources for a PDSCH for a second UE scheduled by the network entity, and receiving from the first UE the PUSCH with the UCI multiplexed on the indicated resources.

Certain aspects of the subject matter described in this disclosure can be implemented in an apparatus for wireless communications by a network entity. The apparatus generally includes at least one application processor and a memory configured to: transmit to a first UE an indication of resources for multiplexing UCI in a PUSCH for the first UE when resources for the PUSCH at least partially overlaps with resources for a PDSCH for a second UE scheduled by the network entity, and receive from the first UE the PUSCH with the UCI multiplexed on the indicated resources.

Certain aspects of the subject matter described in this disclosure can be implemented in an apparatus for wireless communications by a network entity. The apparatus generally includes means for transmitting to a first UE an indication of resources for multiplexing UCI in a PUSCH for the first UE when resources for the PUSCH at least partially overlaps with resources for a PDSCH for a second UE scheduled by the network entity, and means for receiving from the first UE the PUSCH with the UCI multiplexed on the indicated resources.

Certain aspects of the subject matter described in this disclosure can be implemented in a computer readable medium storing computer executable code thereon for wireless communications by a network entity. The computer readable medium generally includes code for transmitting to a first UE an indication of resources for multiplexing UCI in a PUSCH for the first UE when resources for the PUSCH at least partially overlaps with resources for a PDSCH for a second UE scheduled by the network entity, and code for receiving from the first UE the PUSCH with the UCI multiplexed on the indicated resources.

Certain aspects of the subject matter described in this disclosure can be implemented in a method for wireless communications. The method generally includes determining resources for multiplexing a MAC CE when resources for an uplink (UL) MAC data portion and a downlink (DL) MAC data portion at least partially overlap, and processing the MAC CE based on the determination.

Certain aspects of the subject matter described in this disclosure can be implemented in an apparatus for wireless communications. The apparatus generally includes at least one application processor and a memory configured to: determine resources for multiplexing a MAC CE when resources for an UL MAC data portion and a DL MAC data portion at least partially overlap, and process the MAC CE based on the determination.

Certain aspects of the subject matter described in this disclosure can be implemented in an apparatus for wireless communications. The apparatus generally includes means for determining resources for multiplexing a MAC CE when resources for an UL MAC data portion and a DL MAC data portion at least partially overlap, and means for processing the MAC CE based on the determination.

Certain aspects of the subject matter described in this disclosure can be implemented in a computer readable medium storing computer executable code thereon for wireless communications. The computer readable medium generally includes code for determining resources for multiplexing a MAC CE when resources for an UL MAC data portion and a DL MAC data portion at least partially overlap, and code for processing the MAC CE based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 7 summarizes use cases for FD communications shown in FIGS. 4-6, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
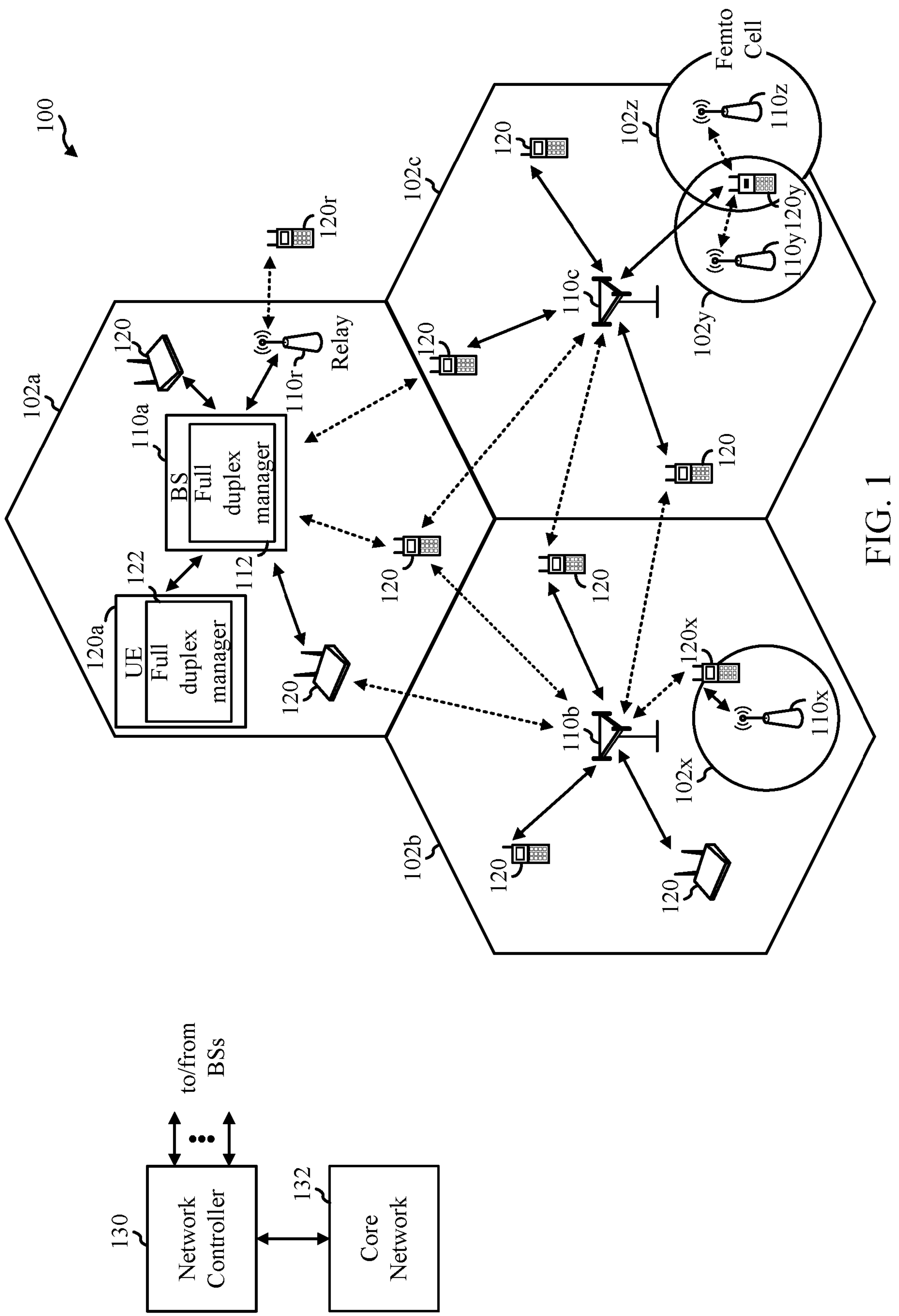
FIG. 1 is a block diagram conceptually illustrating an example wireless communication network, in accordance with certain aspects of the present disclosure.

Aspects of the present disclosure provide apparatus, methods, processing systems, and computer readable mediums for determining resources for multiplexing uplink control information (UCI) and/or medium access control (MAC) control elements (CEs) during a full duplex (FD) operation of a user equipment (UE).

For example, in an FD mode involving FD transmissions and receptions, when resources for an UL transmission (e.g., a configured grant (CG) or dynamically scheduled physical uplink shared channel (PUSCH)) and a DL transmission (e.g., a semi-persistently scheduled (SPS) or dynamically scheduled physical downlink shared channel (PDSCH)) partially overlap, a user equipment (UE) may automatically move resources (e.g., from an overlapped symbol/slot to a non-overlapped symbol/slot) for multiplexing the UCI and/or the MAC CE to improve reliability.

The following description provides examples of modified rules for UCI, UL MAC CE and DL MAC CE multiplexing in wireless communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 for determining resources for multiplexing uplink control information (UCI) and/or medium access control (MAC) control element (CE) during a full duplex (FD) operation. As shown in FIG. 1, a UE 120*a* includes an FD manager 122 and a BS 110*a* includes an FD manager 112. The FD manager 122 may be configured to perform operations 900 of FIG. 9 and/or operations 1300 of FIG. 13. The FD manager 112 may be configured to perform operations 1000 of FIG. 10 and/or operations 1300 of FIG. 13.

The wireless communication network 100 may be a new radio (NR) system (e.g., a 5$^{th}$ generation (5G) NR network). As shown in FIG. 1, the wireless communication network 100 may be in communication with a core network. The core network may in communication with BSs 110*a-z* (each also individually referred to herein as a BS 110 or collectively as BSs 110) and/or UEs 120*a-y* (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells.

The BSs 110 communicate with UEs 120 in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
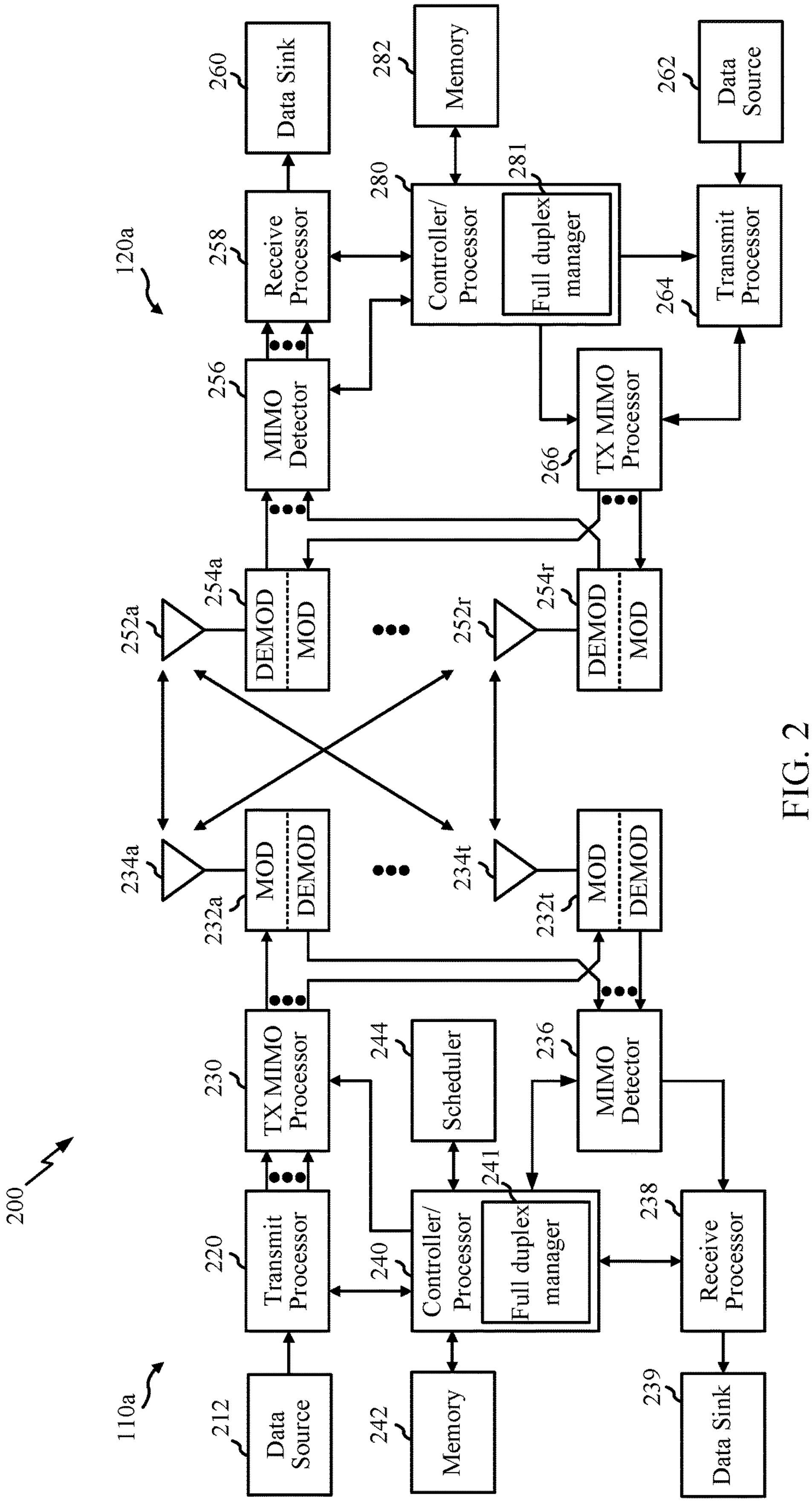
FIG. 2 is a block diagram conceptually illustrating a design of an example base station (BS) and user equipment (UE), in accordance with certain aspects of the present disclosure.

FIG. 2 illustrates example components of a BS 110*a* and a UE 120*a* (e.g., in the wireless communication network 100 of FIG. 1).

At the BS 110*a*, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232*a*-232*t*. Each MOD in transceivers 232*a*-232*t* may process a respective output symbol stream (e.g., for orthogonal frequency division multiplexing (OFDM), etc.) to obtain an output sample stream. Each MOD in transceivers 232*a*-232*t* may further process (e.g., convert to analog, amplify, filter, and upconvert) the output sample stream to obtain a downlink (DL) signal. The DL signals from the MODs in transceivers 232*a*-232*t* may be transmitted via antennas 234*a*-234*t*, respectively.

At the UE 120*a*, antennas 252*a*-252*r* may receive DL signals from the BS 110*a* and may provide received signals to demodulators (DEMODs) in transceivers 254*a*-254*r*, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On an uplink (UL), at the UE 120*a*, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254*a*-254*r* (e.g., for SC-FDM, etc.), and transmitted to the BS 110*a*. At the BS 110*a*, the UL signals from the UE 120*a* may be received by the antennas 234, processed by the DEMODs in transceivers 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

Memories 242 and 282 may store data and program codes for the BS 110*a* and the UE 120*a*, respectively. A scheduler 244 may schedule the UE 120*a* for data transmission on a DL and/or an UL.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has an FD manager 241 that may be configured to perform the operations illustrated in FIG. 10 and/or FIG. 13, as well as other operations disclosed herein. As shown in FIG. 2, the controller/processor 280 of the UE 120*a* has an FD manager 281 that may be configured to perform the operations illustrated in FIG. 9 and/or FIG. 13, as well as other operations disclosed herein. Although shown at the controller/processor, other components of the UE 120*a* and the BS 110*a* may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
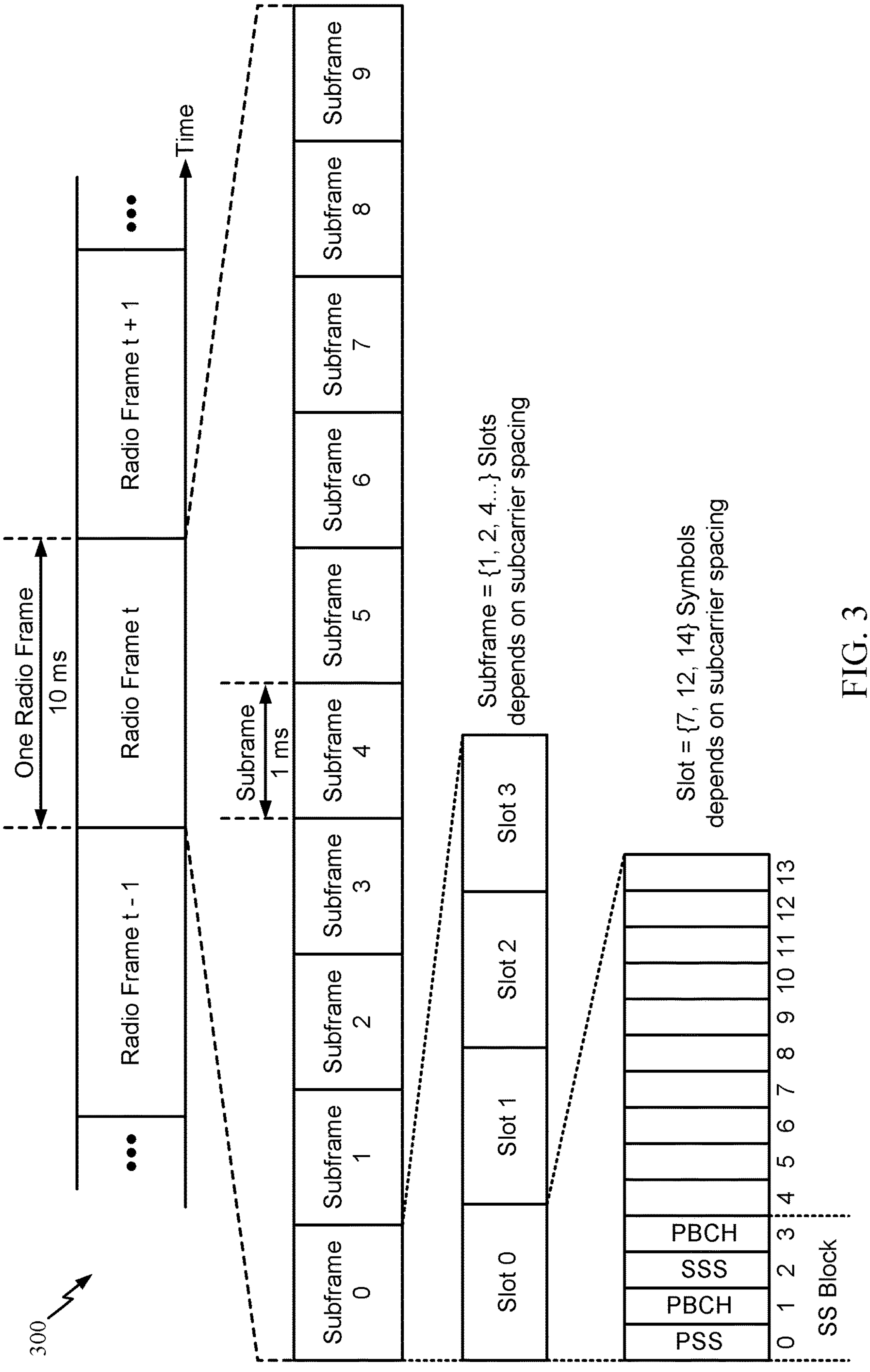
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes PSS, SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example UCI Multiplexing

A user equipment (UE) may use a physical uplink control channel (PUCCH) to send uplink control information (UCI) to a base station (BS). Different types of the UCI may include hybrid automatic retransmission request (HARM) responses (e.g., acknowledgments and negative acknowledgments, or ACK/NAKs) to indicate whether the UE correctly received downlink (DL) transport blocks (TBs), channel state information (CSI) to assist the BS with DL channel-related scheduling determinations, and scheduling requests (SR) to request uplink (UL) resources for the UE to use to transmit data.

In new radio (NR), there are at most up to two PUCCHs that can be scheduled per slot, with each of the two PUCCHs containing one or more UCI types.

In NR, a BS can semi-statically configure a UE with separate PUCCH resources for each type of UCI. These PUCCH resources can be time-domain or frequency-domain multiplexed and are available per slot. If the UE has the UCI to send, then the UE sends the UCI via the PUCCH resources corresponding to that type of UCI.

Each PUCCH resource is configured by the BS and contains the parameters such as a PUCCH format type, a starting symbol index, and a number of symbols. The PUCCH format type is an indication of which common format level parameters to apply to this PUCCH resource. All resources designated with the same format type share these common resources. The starting symbol index is an initial symbol to begin transmitting the PUCCH using this resource. The number of symbols corresponds to a number of contiguous symbols on which to transmit the PUCCH using this resource.

In some cases, when a UE has both a HARQ response and CSI to send in a slot and the individual PUCCH resources for HARQ response and CSI overlap in time, the UE multiplexes the individual resources into a new combined PUCCH resource that may have its own time-domain behavior (i.e., starting symbol index and number of symbols, as described above). The new PUCCH resource is selected by the UE determining the combined payload of the HARQ response and CSI and selecting a PUCCH resource large enough for transmission of the combined payload of the HARQ response and CSI. The new PUCCH resource may be different from either one of the initial PUCCH resources. This practice of combining PUCCH resources happens in an iterative loop until all overlapping PUCCH resources that the UE may have selected for transmitting UCI in a slot have been multiplexed.

Example Full Duplex (FD) Use Cases

The techniques presented herein relate to multiplexing uplink control information (UCI) and/or medium access control (MAC) control element (CE) during a full duplex (FD) operation.

The techniques presented herein may be applied in various bands utilized for new radio (NR). For example, for a higher band referred to as FR4 (e.g., 52.6 GHz-114.25 GHz), an orthogonal frequency division multiplexing (OFDM) waveform with very large subcarrier spacing (960 kHz-3.84 MHz) is required to combat severe phase noise. Due to a large subcarrier spacing (SCS), a slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2x may be used.

There are various motivations for utilizing FD communications, for example, for simultaneous uplink (UL)/downlink (DL) transmissions in FR2. In some cases, FD capability may enable flexible time division duplexing (TDD) capability, and may be present at either a base station (BS) or a user equipment (UE) or both. For example, at the UE, UL transmissions may be sent from one antenna panel (of multiple antenna panels) and DL receptions may be performed at another antenna panel. In another example, at the BS, the UL transmissions may be from one panel and the DL receptions may be performed at another panel.

The FD capability may be conditional on a beam separation (e.g., an ability to find transmitter/receiver (Tx/Rx) beam pairs that achieve sufficient separation). The FD capability may mean that the UE or the BS is able to use frequency division multiplexing (FDM) or spatial division multiplexing (SDM) on slots conventionally reserved for UL-only or DL-only slots (or flexible slots that may be dynamically indicated as either an UL or a DL). Accordingly, potential benefits of the FD communications include latency reduction (e.g., it may be possible to receive DL signals in what would conventionally be considered UL only slots, which can enable latency savings), coverage enhancement, spectrum efficiency enhancements (per cell and/or per UE), and overall more efficient resource utilization.

Figure 4:
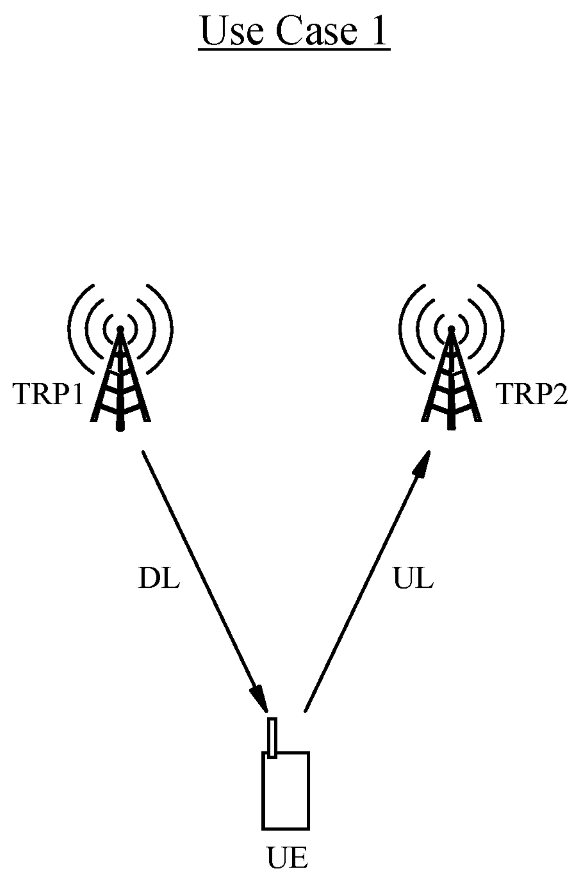
FIGS. 4-6 illustrate different use cases for full duplex (FD) communications, in accordance with certain aspects of the present disclosure.
Figure 5:
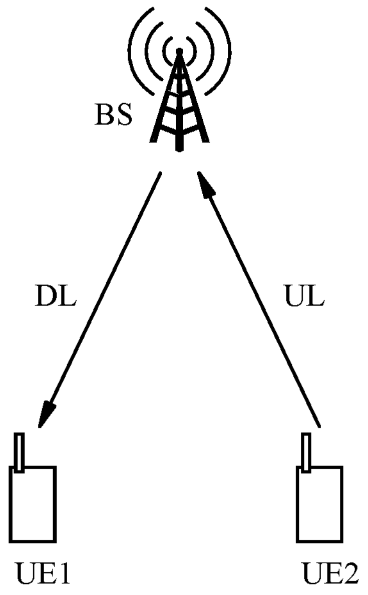
Figure 6:
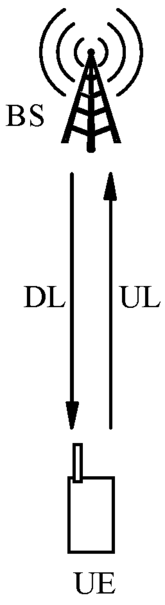

FIGS. 4, 5, and 6 illustrate example use cases for FD communications. FIG. 7 summarizes certain possible features of these use cases.

As illustrated in FIG. 4, for a first use case (Use Case 1), one UE may simultaneously communicate with a first transmitter receiver point (TRP 1) on a DL, while transmitting to a second TRP on an UL. For this use case, FD may be disabled at a BS (i.e., TRP) and enabled at the UE.

As illustrated in FIG. 5, for a second use case (Use Case 2), one BS may simultaneously communicate with a first UE (UE 1) on a DL, while communicating with a second UE (UE 2) on an UL. For this use case, FD may be enabled at the BS and disabled at the UE. Use cases with FD enabled at the BS and disabled at the UE may be suitable for integrated access and backhaul (IAB) applications as well (as illustrated in a table of FIG. 7).

As illustrated in FIG. 6, for a third use case (Use Case 3), a UE may simultaneously communicate with a BS, transmitting on an UL while receiving on a DL. For this use case, FD may be enabled at both the BS and the UE.

Figure 8:
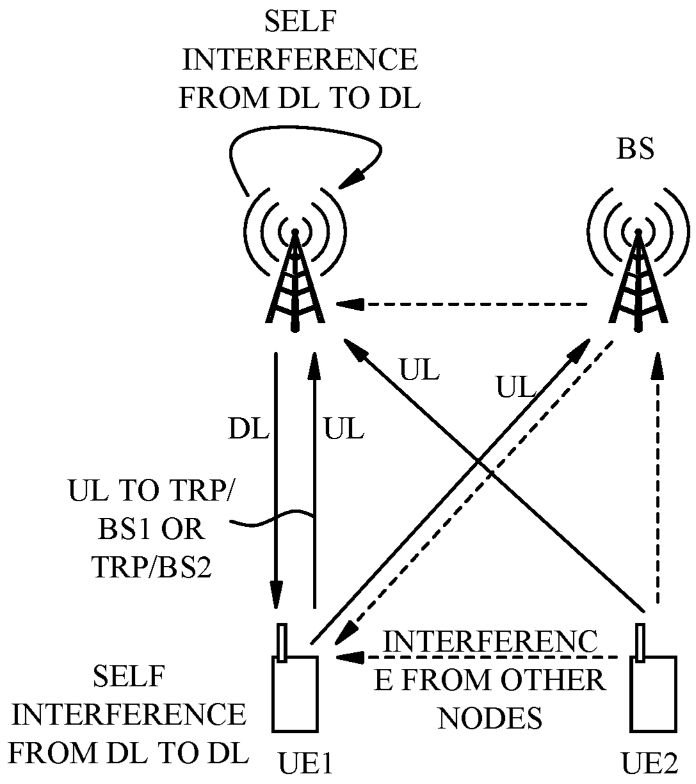
FIG. 8 illustrates an example deployment of multiple UEs and multiple BSs, in accordance with certain aspects of the present disclosure.

As illustrated in FIG. 8, interference to a UE and a BS operating in FD mode could come in a form of the interference from other nodes, as well as self-interference. In some cases, self-interference measurement (SIM) at the UE may be needed to enable FD transmissions. For example, the SIM may be used to select transmit and receive beam pairs that achieve a suitable beam separation. Suitable beam separation of a transmit and receive beam pair may be indicated, for example, by relatively low SIM taken on one panel (using the receive beam) while transmitting UL reference signals with another panel (using the transmit beam). Accordingly, during a SIM procedure, the UE may transmit reference signals (RSs) on an UL using a first antenna panel, while measuring the RSs on a DL with a second antenna panel.

Example Rules for UCI Multiplexing During FD Operation

Per existing techniques, a user equipment (UE) may multiplex uplink control information (UCI) with other uplink (UL) transmissions to a base station (BS). For example, the UE may multiplex the UCI with a configured grant (CG) physical uplink shared channel (PUSCH) transmission, based on offset values. In such cases, the UE may use the offset values to determine a number of resources for multiplexing the UCI in the PUSCH.

In some cases (e.g., a full duplex (FD) mode involving FD transmissions and receptions), UL (e.g., a CG PUSCH or a dynamically scheduled PUSCH) and downlink (DL) (e.g., a semi-persistently scheduled (SPS) physical downlink shared channel (PDSCH) or a dynamically scheduled PDSCH) resources may be scheduled in a partially overlapped FD mode. In such cases, the UL resources for multiplexing the UCI may not be reliable (e.g., due to self-interference).

Aspects of the present disclosure provide apparatus, methods, processing systems, and computer readable mediums for determining resources for multiplexing UCI during an FD operation.

For example, in an FD mode involving FD transmissions and receptions, when resources for an UL (e.g., a CG PUSCH or a dynamically scheduled PUSCH) and a DL (e.g., an SPS PDSCH or a dynamically scheduled PDSCH) partially overlap, a UE may automatically move resources (e.g., from an overlapped symbol/slot to a non-overlapped symbol/slot) for multiplexing the UCI and/or the MAC CE with the UL transmission that is partially overlapped in time with the DL reception to improve reliability.

Figure 9:
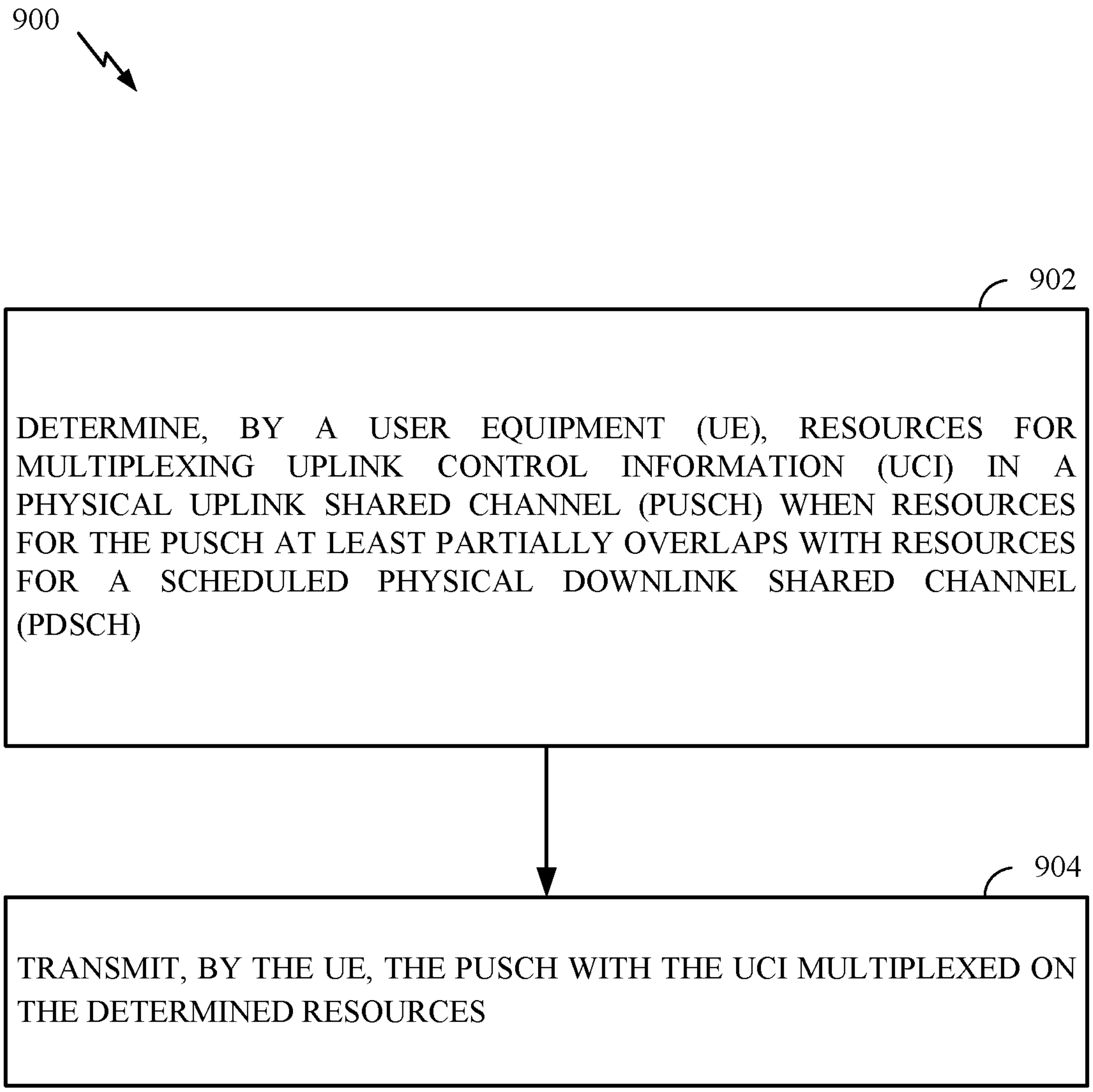
FIG. 9 is a flow diagram illustrating example operations for wireless communication by a UE, in accordance with certain aspects of the present disclosure.

FIG. 9 is a flow diagram illustrating example operations 900 for wireless communication by a UE, in accordance with certain aspects of the present disclosure. The operations 900 may be performed, for example, by the UE 120*a* in the wireless communication network 100, for FD communications. The operations 900 may be implemented as software components that are executed and run on one or more processors (e.g., the controller/processor 280 of FIG. 2). Further, the transmission and reception of signals by the UE in operations 900 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 900 may begin, at block 902, by determining resources for multiplexing UCI in a PUSCH when resources for the PUSCH at least partially overlaps with resources for a scheduled PDSCH. For example, the UE may determine the resources for multiplexing the UCI in the PUSCH using a processor, antenna(s) and/or transceiver components of the UE 120*a* shown in FIG. 1 or FIG. 2 and/or of the apparatus shown in FIG. 14.

At 904, the UE transmits the PUSCH with the UCI multiplexed on the determined resources. For example, the UE may transmit the PUSCH with the UCI multiplexed on the determined resources using antenna(s) and transmitter/transceiver components of the UE 120*a* shown in FIG. 1 or FIG. 2 and/or of the apparatus shown in FIG. 14.

Figure 10:
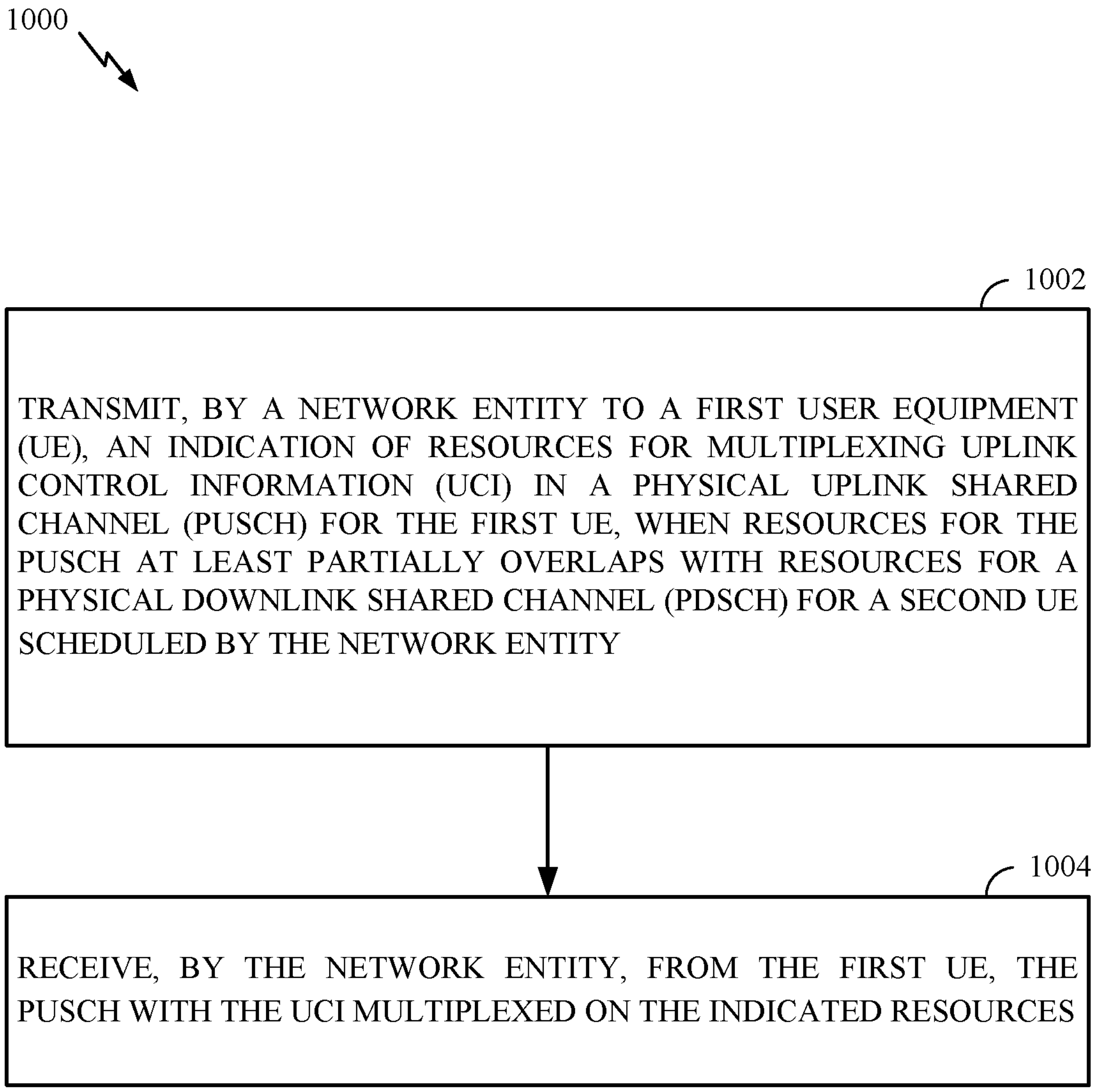
FIG. 10 is a flow diagram illustrating example operations for wireless communication by a network entity, in accordance with certain aspects of the present disclosure.

FIG. 10 is a flow diagram illustrating example operations 1000 for wireless communication by a network entity, in accordance with certain aspects of the present disclosure. The operations 1000 may be performed, for example, by the network entity (e.g., such as the BS 110*a* in the wireless communication network 100), for FD communications. The operations 1000 may be implemented as software components that are executed and run on one or more processors (e.g., the controller/processor 240 of FIG. 2). Further, the transmission and reception of signals by the network entity in operations 1000 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1000 may begin, at block 1002, by transmitting to a first UE an indication of resources for multiplexing UCI in a PUSCH for the first UE, when resources for the PUSCH at least partially overlaps with resources for a PDSCH for a second UE scheduled by the network entity. For example, the network entity may transmit the indication of the resources for multiplexing the UCI in the PUSCH for the first UE to the first UE using antenna(s) and transmitter/transceiver components of the BS 110*a* shown in FIG. 1 or FIG. 2 and/or of the apparatus shown in FIG. 15.

In certain aspects, the PDSCH may include an SPS PDSCH. In certain aspects, the indication may be transmitted in a previous SPS occasion. In certain aspects, the indication may be transmitted to the first UE via a DCI. In one example, the DCI may schedule the PUSCH. In another example, the DCI may include a non-scheduling DCI.

At 1004, the network entity receives from the first UE the PUSCH with the UCI multiplexed on the indicated resources. For example, the network entity may receive the PUSCH with the UCI multiplexed on the indicated resources from the first UE using antenna(s) and receiver/transceiver components of the BS 110*a* shown in FIG. 1 or FIG. 2 and/or of the apparatus shown in FIG. 15.

Figure 11:
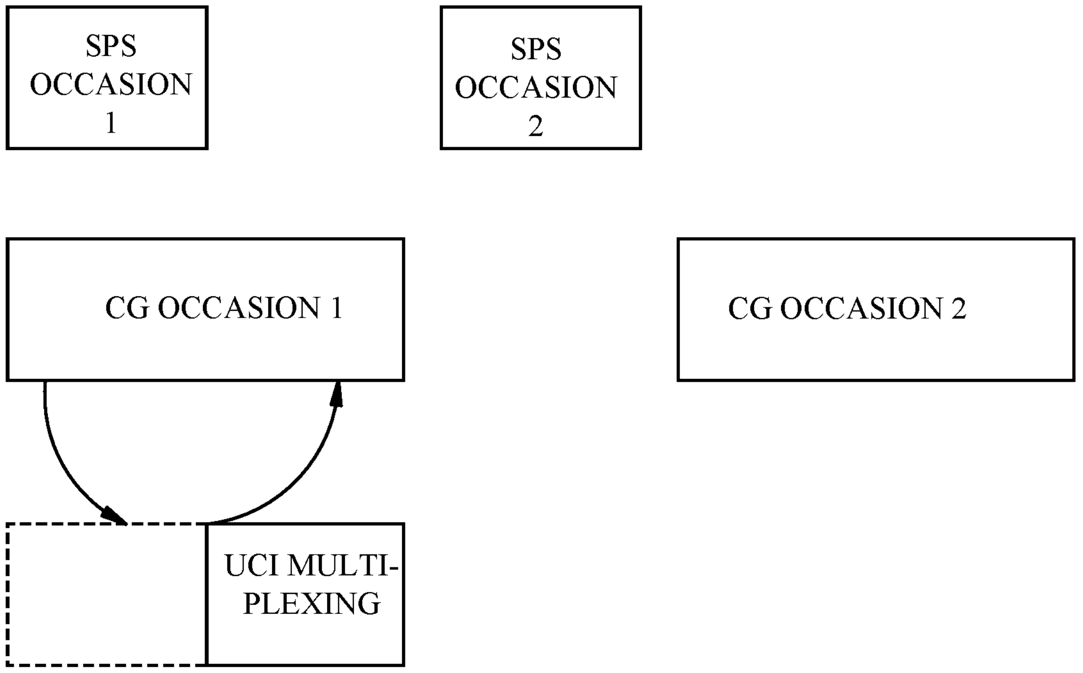
FIG. 11 illustrates an example of overlap between a semi-persistently scheduled (SPS) occasion and a configured grant (CG) occasion during an FD operation, in accordance with certain aspects of the present disclosure.
Figure 12:
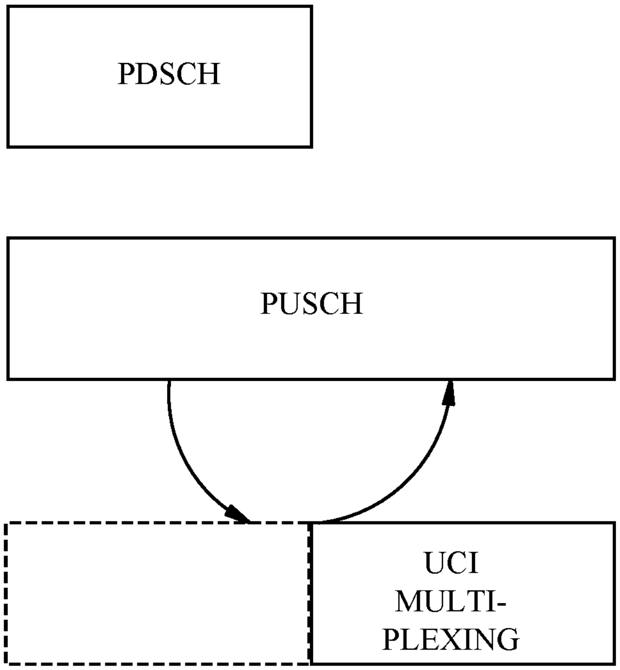
FIG. 12 illustrates an example of overlap between resources for a physical uplink shared channel (PUSCH) and resources for a physical downlink shared channel (PDSCH) during an FD operation, in accordance with certain aspects of the present disclosure.

The operations shown in FIGS. 9-10 may be understood with reference to the FIGS. 11-12.

As noted above, a UE may determine whether resources for a PUSCH and resources for a PDSCH partially overlap. In one example, the PUSCH may include a CG PUSCH. In another example, the PUSCH may include a dynamically scheduled PUSCH. In one example, the PDSCH may include an SPS PDSCH. In another example, the PDSCH may include a dynamically scheduled PDSCH.

As illustrated in FIGS. 11-12, when a UE may determine that resources for a PUSCH partially overlap with resources for a scheduled PDSCH (i.e., an UL resource (PUSCH or CG occasion 1) and a DL resource (PDSCH or SPS occasion 1) are scheduled in a partially overlapped FD mode), the UE may determine resources for multiplexing UCI in the PUSCH. In one example, the resources for multiplexing the UCI in the PUSCH may include one or more time UL resources of the PUSCH that are non-overlapping with the PDSCH. In another example, the UE may receive an indication from a BS indicating the one or more time UL resources (e.g., non-overlapped symbols/slots) for multiplexing the UCI in the PUSCH.

In certain aspects, a PDSCH may be scheduled via a downlink control information (DCI). For example, a BS may transmit the DCI to the UE to schedule the PDSCH. The BS may also use the DCI to indicate resources for the PDSCH that may overlap with a PUSCH. The PDSCH may include a PDSCH scheduled for the same UE as the PUSCH. In another example, the BS may transmit the DCI (e.g., a group-common DCI that may schedule multiple UEs) to the UE that may schedule the PDSCH for another UE as well. In such cases, as noted above, when resources for the PUSCH may partially overlap with resources for the scheduled PDSCH, the UE may determine the resources for multiplexing the UCI in the PUSCH as one or more time UL resources of the PUSCH that are non-overlapping with the PDSCH.

In one non-limiting example (use case 1), all UL and DL resources are scheduled for a single UE, and the UE knows all SPS occasions and CG occasions. In such a case, when there is an overlap between resources for a first CG occasion (CG occasion 1) and resources for a first SPS occasion (SPS occasion 1) scheduled for the UE, the UE may automatically move resources for multiplexing UCI. For example, as illustrated in FIG. 11, when there are two symbols/slots for the first CG occasion scheduled for the UE, and a first symbol/slot for the first CG occasion may overlap with the first SPS occasion scheduled for the UE, the UE may move UCI multiplexing resource starting from the first symbol/slot for the first CG occasion (i.e., from FD resources) to a second non-overlapped symbol/slot for the first CG occasion (i.e., to half-duplex (HD) resources). This is because the UE may prefer to multiplex the UCI on the HD resources rather than the FD resources since the FD resources are less reliable (e.g., due to self-interference) than the HD resources. The UE may then transmit the UCI multiplexed on the second non-overlapped symbol/slot for the first CG occasion.

In another non-limiting example (use case 2 of multi-UE with a group common DCI scheduling), multiple UEs may be scheduled by a group common DCI and thus each UE may know scheduling information of other UEs. In such a case, when there is an overlap between resources for a first CG occasion (CG occasion 1) and resources for a first SPS occasion (SPS occasion 1) scheduled for different UEs, a UE may be able to automatically move resources for multiplexing UCI (since the UE is aware of scheduling information of other UEs). For example, as illustrated in FIG. 11, when there are two symbols/slots for the first CG occasion (e.g., scheduled for a first UE), and a first symbol/slot for the first CG occasion may overlap with the first SPS occasion (e.g., scheduled for a second UE), the first UE may move UCI multiplexing resource starting from the first symbol/slot for the first CG occasion to a second non-overlapped symbol/slot for the first CG occasion. The first UE may then transmit the UCI multiplexed on the second non-overlapped symbol/slot for the first CG occasion.

In certain aspects, a PDSCH may be intended for another UE and the PDSCH may include an SPS PDSCH. In such cases, when resources for a PUSCH for a UE may partially overlap with resources for a scheduled PDSCH of another UE, a BS may send an indication to the UE indicating one or more time UL resources for multiplexing UCI. In one example, the UE may receive the indication from the BS in a previous SPS occasion. In another example, the UE may receive the indication from the BS via a DCI. In certain aspects, the DCI may schedule the PUSCH. In certain aspects, the DCI may include a different DCI that is not scheduling the PUSCH.

In one non-limiting example (use case 2 of multi-UE with a separate DCI scheduling per UE), each UE may be scheduled by a separate DCI. In such a case, an UL UE may not know scheduling information of a DL UE. Accordingly, when there are two symbols/slots for a first CG occasion of the UL UE, and a first symbol/slot for the first CG occasion of the UL UE may overlap with a first SPS occasion of the DL UE, a BS may send an indication to indicate a starting symbol for multiplexing the UCI on a second non-overlapped symbol/slot for the UL UE. The BS may send the indication (when needed) to the UL UE in a previous SPS occasion (i.e., the SPS occasion just before the first SPS occasion), a separate DCI, and/or the DCI scheduling the PUSCH. Based on the received indication, the UL UE may transmit the UCI multiplexed on the second non-overlapped symbol/slot for the first CG occasion.

Example Rules for MAC CE Multiplexing During FD Operation

In some cases, a downlink (DL) medium access control (MAC) control element (CE) may always be multiplexed before a MAC data portion, and an uplink (UL) MAC-CE may always be multiplexed after the MAC data portion. In such cases, the DL MAC-CE and the UL MAC-CE may be multiplexed on overlapped full duplex (FD) resources, which is not desirable (since the FD resources are not reliable).

Aspects of the present disclosure provide apparatus, methods, processing systems, and computer readable mediums for determining resources for multiplexing MAC CE (e.g., UL MAC CE and DL MAC CE) during an FD operation.

The rules (noted above) for determining resources for multiplexing uplink control information (UCI) during the FD operation are applicable for determining the resources for multiplexing the MAC CE. Based on the rules, the DL MAC-CE and the UL MAC-CE may be switched to non-overlapped half duplex (HD) resources for multiplexing.

Figure 13:
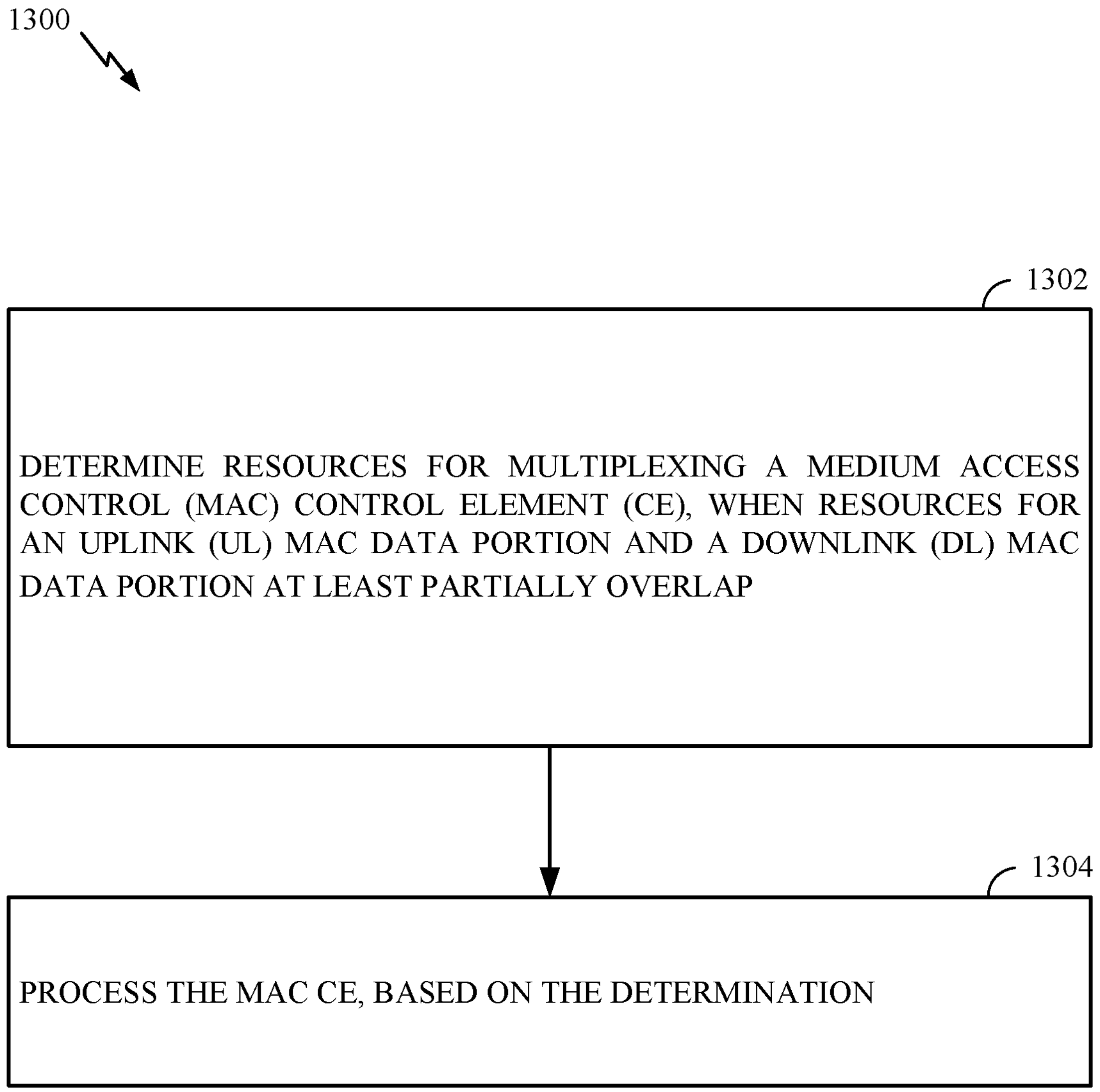
FIG. 13 is a flow diagram illustrating example operations for wireless communication by a UE, in accordance with certain aspects of the present disclosure.

FIG. 13 is a flow diagram illustrating example operations 1300 for wireless communication, in accordance with certain aspects of the present disclosure. In one example, the operations 1300 may be performed by a UE (e.g., the UE 120*a* in the wireless communication network 100), for FD communications. The operations 1300 may be implemented as software components that are executed and run on one or more processors (e.g., the controller/processor 280 of FIG. 2). Further, the transmission and reception of signals by the UE in operations 1100 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1300 may begin, at block 1302, by determining resources for multiplexing a MAC CE when resources for an UL MAC data portion and a DL MAC data portion at least partially overlap. For example, the UE may determine the resources for multiplexing the MAC CE using a processor, antenna(s) and transceiver components of the UE 120*a* shown in FIG. 1 or FIG. 2 and/or of the apparatus shown in FIG. 16.

At 1304, the UE processes the MAC CE based on the determination. For example, the UE may process the MAC CE using a processor, antenna(s), and transceiver components of the UE 120*a* shown in FIG. 1 or FIG. 2 and/or of the apparatus shown in FIG. 16.

In certain aspects, a UE may determine whether resources for an UL MAC data portion and resources for a DL MAC data portion partially overlap. In one example, the UL MAC data portion may include a CG PUSCH. In another example, the UL MAC data portion may include a dynamically scheduled PUSCH. In one example, the DL MAC data portion may include an SPS PDSCH. In another example, the DL MAC data portion may include a dynamically scheduled PDSCH. When the resources for the UL MAC data portion and the DL MAC data portion may partially overlap, the UE may determine resources for multiplexing a MAC CE.

In certain aspects, when a UE may determine that resources for an UL MAC data portion may partially overlap with resources for a DL MAC data portion, the UE may determine the resources for multiplexing an UL MAC CE in the UL MAC data portion. In one example, the resources for multiplexing the UL MAC CE in the UL MAC data portion may include one or more time UL resources of the UL MAC data portion that are non-overlapping with the DL MAC data portion. In another example, the resources for multiplexing the UL MAC CE in the UL MAC data portion may include one or more time UL resources of the UL MAC data portion identified based on an indication from a BS (e.g., the BS sends the indication to the UE of the one or more time UL resources of the UL MAC data portion that are non-overlapping with the DL MAC data portion). The UE may then transmit the UL MAC CE multiplexed on the determined non-overlapping resources. The BS may receive and process the UL MAC CE from the UE.

In certain aspects, when resources for a DL MAC data portion may partially overlap with resources for an UL MAC data portion, a UE may receive an indication from a BS of the resources for multiplexing a DL MAC CE in the DL MAC data portion for the UE. In one example, the resources for multiplexing the DL MAC CE may include one or more time DL resources of the DL MAC data portion that are non-overlapping with the UL MAC data portion. The BS may send the DL MAC CE multiplexed on the indicated resources to the UE. The UE may receive and process the DL MAC CE multiplexed on the indicated resources from the BS.

In certain aspects, the operations 1300 may be performed by a network entity (e.g., the BS 110*a* in the wireless communication network 100). For example, the network entity may determine resources for multiplexing a MAC CE when resources for an UL MAC data portion and a DL MAC data portion partially overlap, and then process the MAC CE (based on the determination).

In certain aspects, when a network entity may determine that resources for a DL MAC data portion may partially overlap with resources for an UL MAC data portion, the network entity may determine the resources for multiplexing a DL MAC CE in the DL MAC data portion. In one example, the resources for multiplexing the DL MAC CE in the DL MAC data portion may include one or more time DL resources of the DL MAC data portion that are non-overlapping with the UL MAC data portion. The network entity may then transmit the DL MAC CE multiplexed on the determined non-overlapping resources. The UE may receive and process the DL MAC CE from the network entity.

In certain aspects, when resources for an UL MAC data portion may partially overlap with resources for a DL MAC data portion, a network entity may send an indication to the UE of the resources for multiplexing an UL MAC CE in the UL MAC data portion for the UE. In one example, the resources for multiplexing the UL MAC CE may include one or more time UL resources of the UL MAC data portion that are non-overlapping with the DL MAC data portion. The UE may send the UL MAC CE multiplexed on the indicated resources to the network entity. The network entity may receive and process the UL MAC CE multiplexed on the indicated resources.

Example Wireless Communication Devices

Figure 14:
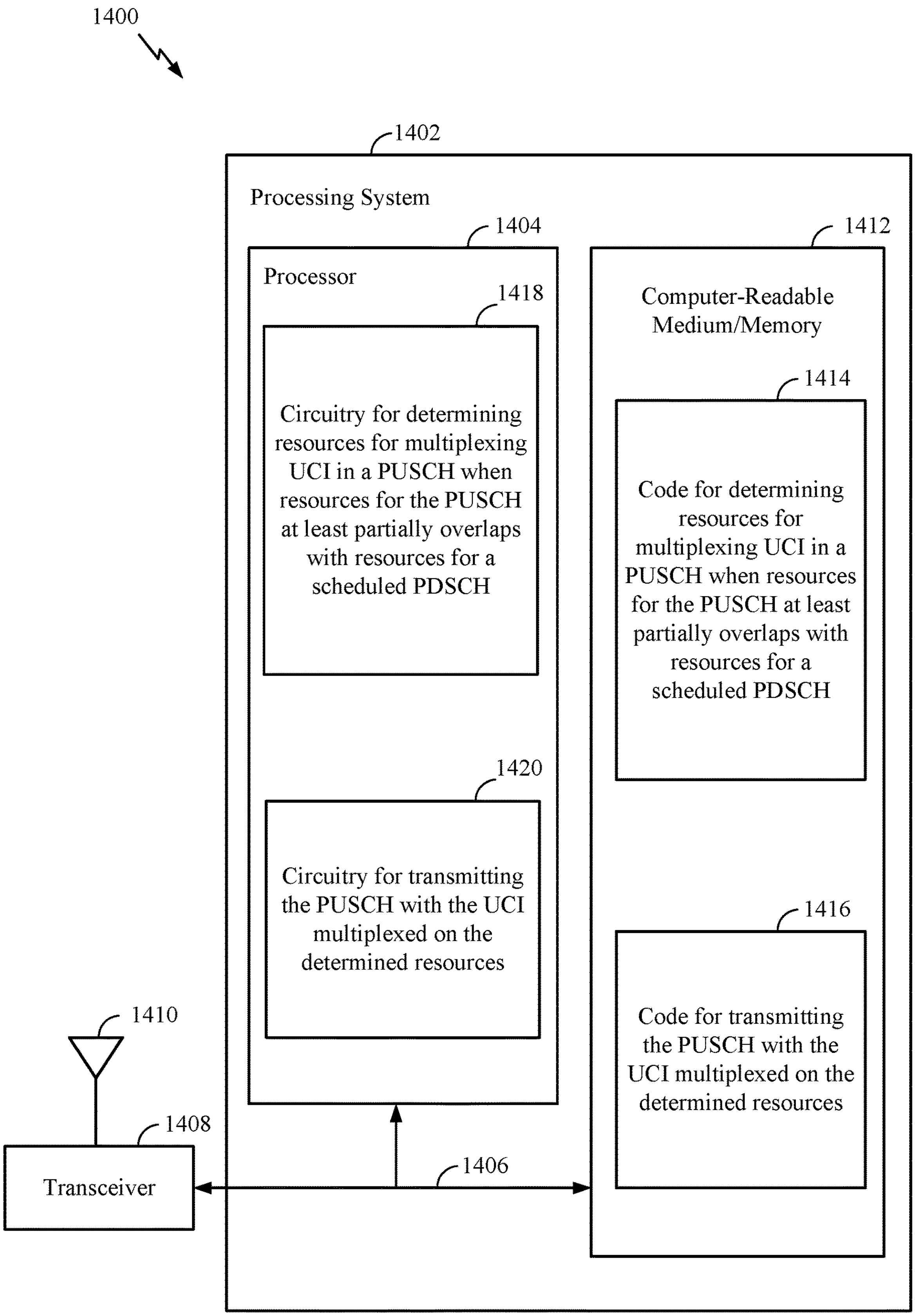
FIG. 14 illustrates an example communications device that include various components capable of performing operations (e.g., UCI multiplexing) for the techniques disclosed herein, in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 9. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., a computer-executable code) that when executed by the processor 1404, cause the processor 1404 to perform the operations illustrated in FIG. 9, or other operations for performing the various techniques discussed herein. In certain aspects, computer-readable medium/memory 1412 stores code 1414 for determining and code 1416 for transmitting. The code 1414 for determining may include code for determining resources for multiplexing uplink control information (UCI) in a physical uplink shared channel (PUSCH) when resources for the PUSCH at least partially overlaps with resources for a scheduled physical downlink shared channel (PDSCH). The code 1416 for transmitting may include code for transmitting the PUSCH with the UCI multiplexed on the determined resources.

The processor 1404 may include circuitry configured to implement the code stored in the computer-readable medium/memory 1412, such as for performing the operations illustrated in FIG. 9, as well as other operations for performing the various techniques discussed herein. For example, the processor 1404 includes circuitry 1418 for determining and circuitry 1420 for transmitting. The circuitry 1418 for determining may include circuitry for determining resources for multiplexing UCI in a PUSCH when resources for the PUSCH at least partially overlaps with resources for a scheduled PDSCH. The circuitry 1420 for transmitting may include circuitry for transmitting the PUSCH with the UCI multiplexed on the determined resources.

Figure 15:
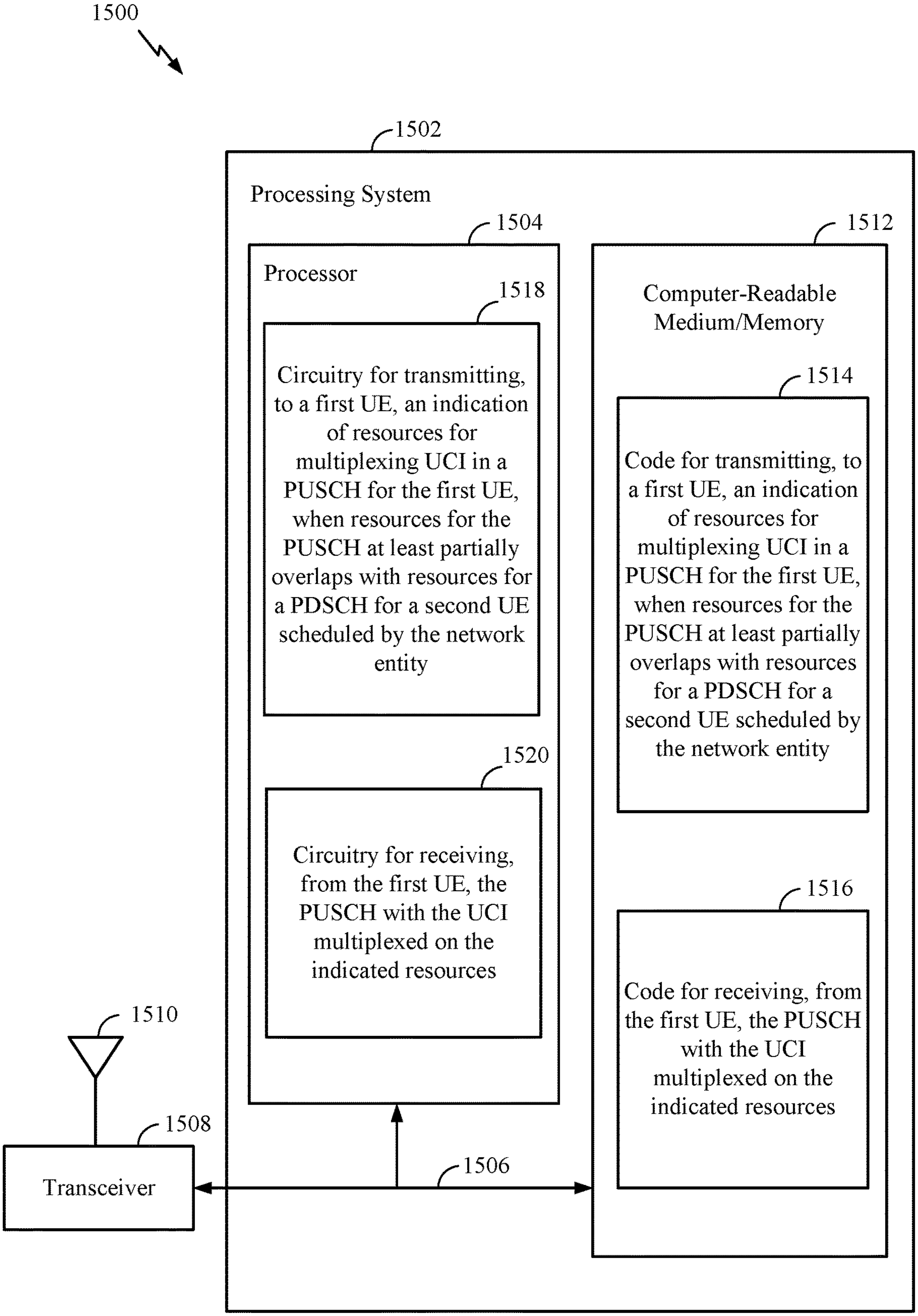
FIG. 15 illustrates an example communications device that include various components capable of performing operations (e.g., UCI multiplexing) for the techniques disclosed herein, in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., a computer-executable code) that when executed by the processor 1504, cause the processor 1504 to perform the operations illustrated in FIG. 10, or other operations for performing the various techniques discussed herein. In certain aspects, computer-readable medium/memory 1512 stores code 1514 for transmitting and code 1516 for receiving. The code 1514 for transmitting may include code for transmitting to a first user equipment (UE) an indication of resources for multiplexing UCI in a PUSCH for the first UE when resources for the PUSCH at least partially overlaps with resources for a PDSCH for a second UE scheduled by the network entity. The code 1516 for receiving may include code for receiving from the first UE the PUSCH with the UCI multiplexed on the indicated resources.

The processor 1504 may include circuitry configured to implement the code stored in the computer-readable medium/memory 1512, such as for performing the operations illustrated in FIG. 10, as well as other operations for performing the various techniques discussed herein. For example, the processor 1504 includes circuitry 1518 for transmitting and circuitry 1520 for receiving. The circuitry 1518 for transmitting may include circuitry for transmitting to a first UE an indication of resources for multiplexing UCI in a PUSCH for the first UE when resources for the PUSCH at least partially overlaps with resources for a PDSCH for a second UE scheduled by the network entity. The circuitry 1520 for receiving may include circuitry for receiving from the first UE the PUSCH with the UCI multiplexed on the indicated resources.

Figure 16:
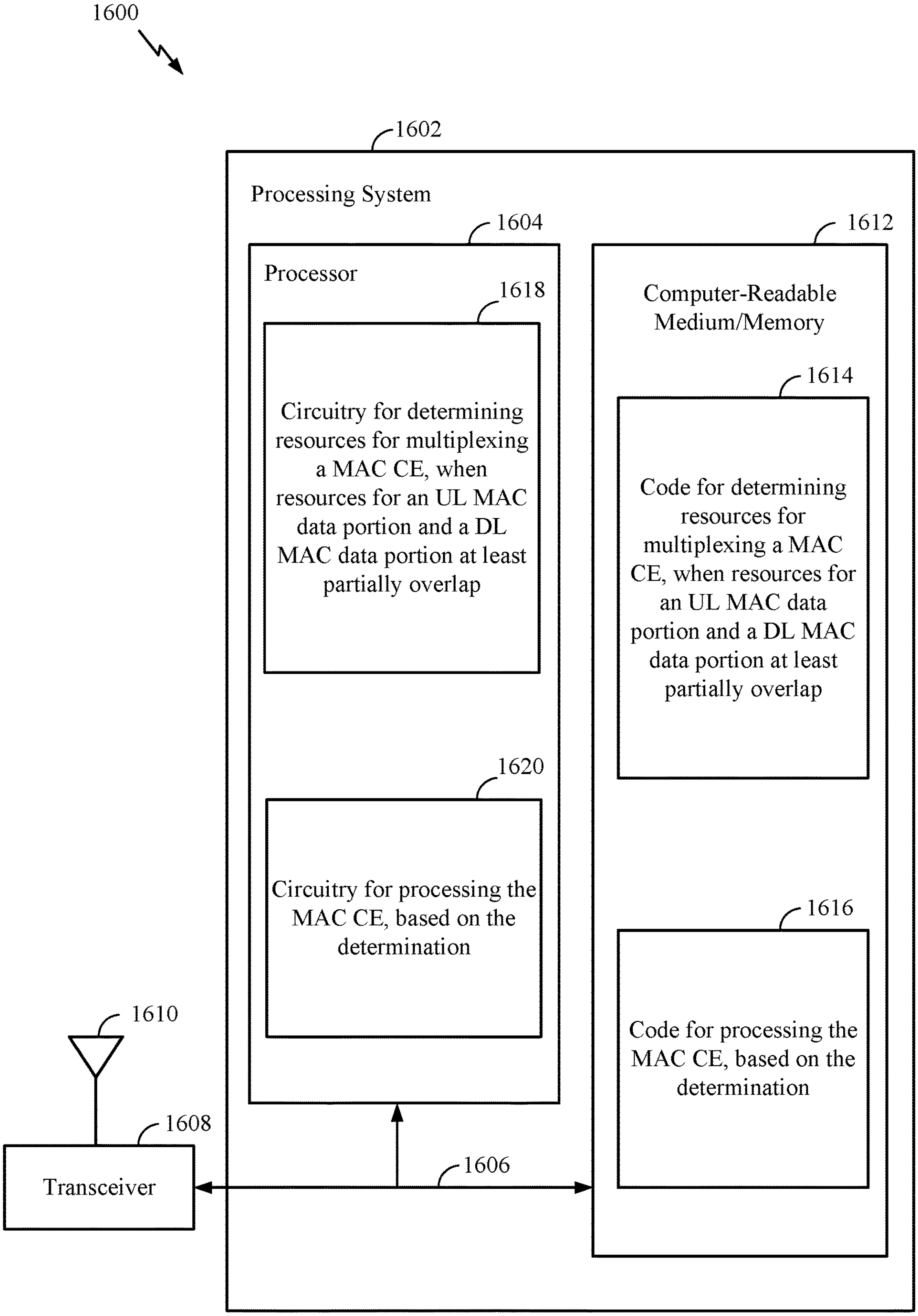
FIG. 16 illustrates an example communications device that include various components capable of performing operations (e.g., MAC CE multiplexing) for the techniques disclosed herein, in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 11. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 is configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., a computer-executable code) that when executed by the processor 1604, cause the processor 1604 to perform the operations illustrated in FIG. 11, or other operations for performing the various techniques discussed herein. In certain aspects, computer-readable medium/memory 1612 stores code 1614 for determining and code 1616 for processing. The code 1614 for determining resources for multiplexing a medium access control (MAC) control element (CE), when resources for an uplink (UL) MAC data portion and a downlink (DL) MAC data portion at least partially overlap. The code 1616 for processing may include code for processing the MAC CE based on the determination.

The processor 1604 may include circuitry configured to implement the code stored in the computer-readable medium/memory 1612, such as for performing the operations illustrated in FIG. 11, as well as other operations for performing the various techniques discussed herein. For example, the processor 1604 includes circuitry 1618 for determining and circuitry 1620 for processing. The circuitry 1618 for determining may include circuitry for determining resources for multiplexing a MAC CE when resources for an UL MAC data portion and a DL MAC data portion at least partially overlap. The circuitry 1620 for processing may include circuitry for processing the MAC CE based on the determination.

Example Aspects

Implementation examples are described in the following numbered aspects.

In a first aspect, a method for wireless communications by a user equipment (UE), comprising: determining resources for multiplexing uplink control information (UCI) in a physical uplink shared channel (PUSCH) when resources for the PUSCH at least partially overlaps with resources for a scheduled physical downlink shared channel (PDSCH); and transmitting the PUSCH with the UCI multiplexed on the determined resources.

In a second aspect, alone or in combination with the first aspect, the PUSCH comprises a configured grant (CG) PUSCH or a dynamically scheduled PUSCH.

In a third aspect, alone or in combination with one or more of the first and second aspects, the PDSCH comprises a semi-persistently scheduled (SPS) PDSCH or a dynamically scheduled PDSCH.

In a fourth aspect, alone or in combination with one or more of the first through third aspects, the PDSCH is scheduled via a downlink control information (DCI) that indicates the resources for the PDSCH that overlap with the PUSCH; and the resources for multiplexing the UCI comprise one or more time uplink (UL) resources of the PUSCH that are non-overlapping with the PDSCH.

In a fifth aspect, alone or in combination with one or more of the first through fourth aspects, the PDSCH comprises a PDSCH scheduled for the same UE as the PUSCH.

In a sixth aspect, alone or in combination with one or more of the first through fifth aspects, the DCI comprises a group-common DCI that schedules the PDSCH for another UE.

In a seventh aspect, alone or in combination with one or more of the first through sixth aspects, the PDSCH is intended for another UE; and the resources for multiplexing the UCI comprise one or more time uplink (UL) resources identified by an indication from a network entity that scheduled the PDSCH.

In an eighth aspect, alone or in combination with one or more of the first through seventh aspects, the PDSCH comprises a semi-persistently scheduled (SPS) PDSCH; and the indication is provided in a previous SPS occasion.

In a ninth aspect, alone or in combination with one or more of the first through eighth aspects, the indication is provided via a downlink control information (DCI).

In a tenth aspect, alone or in combination with one or more of the first through ninth aspects, the DCI schedules the PUSCH.

In an eleventh aspect, alone or in combination with one or more of the first through tenth aspects, the DCI comprises a different DCI that is not scheduling the PUSCH.

In a twelfth aspect, a method for wireless communications by a network entity, comprising: transmitting, to a first user equipment (UE), an indication of resources for multiplexing uplink control information (UCI) in a physical uplink shared channel (PUSCH) for the first UE, when resources for the PUSCH at least partially overlaps with resources for a physical downlink shared channel (PDSCH) for a second UE scheduled by the network entity; and receiving, from the first UE, the PUSCH with the UCI multiplexed on the indicated resources.

In a thirteenth aspect, alone or in combination with the twelfth aspect, the PUSCH comprises a configured grant (CG) PUSCH or a dynamically scheduled PUSCH.

In a fourteenth aspect, alone or in combination with one or more of the twelfth and thirteenth aspects, the PDSCH comprises a semi-persistently scheduled (SPS) PDSCH or a dynamically scheduled PDSCH.

In a fifteenth aspect, alone or in combination with one or more of the twelfth through fourteenth aspects, the PDSCH comprises a semi-persistently scheduled (SPS) PDSCH; and the indication is transmitted in a previous SPS occasion.

In a sixteenth aspect, alone or in combination with one or more of the twelfth to fifteenth aspects, the indication is transmitted via a downlink control information (DCI).

In a seventeenth aspect, alone or in combination with one or more of the twelfth to sixteenth aspects, the DCI schedules the PUSCH.

In an eighteenth aspect, alone or in combination with one or more of the twelfth to seventeenth aspects, the DCI comprises a non-scheduling DCI.

In a nineteenth aspect, a method for wireless communications by a user equipment (UE), comprising: determining resources for multiplexing a medium access control (MAC) control element (CE), when resources for an uplink (UL) MAC data portion and a downlink (DL) MAC data portion at least partially overlap; and processing the MAC CE, based on the determination.

In a twentieth aspect, alone or in combination with the nineteenth aspect, the processing comprises: determining the resources for multiplexing the MAC CE in the UL MAC data portion, when the resources for the UL MAC data portion at least partially overlaps with the resources for the DL MAC data portion; and transmitting the MAC CE multiplexed on the determined resources.

In a twenty-first aspect, alone or in combination with one or more of the nineteenth and twentieth aspects, the resources for multiplexing the MAC CE comprise one or more time UL resources of the UL MAC data portion that are non-overlapping with the DL MAC data portion.

In a twenty-second aspect, alone or in combination with one or more of the nineteenth through twenty-first aspects, the resources for multiplexing the MAC CE comprise one or more time UL resources of the UL MAC data portion identified by an indication from a network entity.

In a twenty-third aspect, alone or in combination with one or more of the nineteenth through twenty-second aspects, the processing comprises: receiving, from a network entity, an indication of the resources for multiplexing the MAC CE in the DL MAC data portion for the UE, when the resources for the DL MAC data portion at least partially overlaps with the resources for the UL MAC data portion; and receiving, from the network entity, the MAC CE multiplexed on the indicated resources.

In a twenty-fourth aspect, alone or in combination with one or more of the nineteenth through twenty-third aspects, the indicated resources for multiplexing the MAC CE comprise one or more time DL resources of the DL MAC data portion that are non-overlapping with the UL MAC data portion.

In a twenty-fifth aspect, a method for wireless communications by a network entity, comprising: determining resources for multiplexing a medium access control (MAC) control element (CE), when resources for an uplink (UL) MAC data portion and a downlink (DL) MAC data portion at least partially overlap; and processing the MAC CE, based on the determination.

In a twenty-sixth aspect, alone or in combination with the twenty-fifth aspect, the processing comprises: determining the resources for multiplexing the MAC CE in the DL MAC data portion, when the resources for the DL MAC data portion at least partially overlaps with the resources for the UL MAC data portion; and transmitting the MAC CE multiplexed on the determined resources.

In a twenty-seventh aspect, alone or in combination with one or more of the twenty-fifth and twenty-sixth aspects, the resources for multiplexing the MAC CE comprise one or more time DL resources of the DL MAC data portion that are non-overlapping with the UL MAC data portion.

In a twenty-eighth aspect, alone or in combination with one or more of the twenty-fifth through twenty-seventh aspects, the processing comprises: sending, to a user equipment (UE), an indication of the resources for multiplexing the MAC CE in the UL MAC data portion for the UE, when the resources for the UL MAC data portion at least partially overlaps with the resources for the DL MAC data portion; and receiving, from the UE, the MAC CE multiplexed on the indicated resources.

In a twenty-ninth aspect, alone or in combination with one or more of the twenty-fifth through twenty-eighth aspects, the indicated resources for multiplexing the MAC CE comprise one or more time UL resources of the UL MAC data portion that are non-overlapping with the DL MAC data portion.

An apparatus for wireless communication, comprising at least one processor; and a memory coupled to the at least one processor, the memory comprising code executable by the at least one processor to cause the apparatus to perform the method of any of the first through twenty-ninth aspects.

An apparatus comprising means for performing the method of any of the first through twenty-ninth aspects.

A computer readable medium storing computer executable code thereon for wireless communications that, when executed by at least one processor, cause an apparatus to perform the method of any of the first through twenty-ninth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 9-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communications at a user equipment (UE), comprising:
- one or more memories comprising instructions; and
- one or more processors configured, individually or in any combination, to execute the instructions to cause the apparatus to:
  - determine resources for multiplexing uplink control information (UCI) in a physical uplink shared channel (PUSCH) when resources for the PUSCH at least partially overlap with resources for a scheduled physical downlink shared channel (PDSCH); and
  - transmit the PUSCH with the UCI multiplexed on the determined resources comprising a subset of the resources for the PUSCH that are non-overlapping with the resources for the scheduled PDSCH, wherein the determined resources exclude resources for the PUSCH that overlap with the resources for the scheduled PDSCH.

2. The apparatus of claim 1, wherein the PUSCH comprises a configured grant (CG) PUSCH or a dynamically scheduled PUSCH.

3. The apparatus of claim 1, wherein the PDSCH comprises a semi-persistently scheduled (SPS) PDSCH or a dynamically scheduled PDSCH.

4. The apparatus of claim 1, wherein:
- the PDSCH is scheduled via a downlink control information (DCI) that indicates the resources for the PDSCH that overlap with the PUSCH; and
- the resources for multiplexing the UCI comprise one or more time uplink (UL) resources of the PUSCH that are non-overlapping with the PDSCH.

5. The apparatus of claim 4, wherein the PDSCH comprises a PDSCH scheduled for the same UE as the PUSCH.

6. The apparatus of claim 4, wherein the DCI comprises a group-common DCI that schedules the PDSCH for another UE.

7. The apparatus of claim 1, wherein:
- the PDSCH is intended for another UE; and
- the resources for multiplexing the UCI comprise one or more time uplink (UL) resources identified by an indication from a network entity that scheduled the PDSCH.

8. The apparatus of claim 7, wherein:
- the PDSCH comprises a semi-persistently scheduled (SPS) PDSCH; and
- the indication is provided in a previous SPS occasion.

9. The apparatus of claim 7, wherein the indication is provided via a downlink control information (DCI).

10. The apparatus of claim 9, wherein the DCI schedules the PUSCH.

11. The apparatus of claim 9, wherein the DCI comprises a different DCI that is not scheduling the PUSCH.

12. An apparatus for wireless communications at a network entity, comprising:
- one or more memories comprising instructions; and
- one or more processors configured, individually or in any combination, to execute the instructions to cause the apparatus to:
  - transmit, to a first user equipment (UE), an indication of resources for multiplexing uplink control information (UCI) in a physical uplink shared channel (PUSCH) for the first UE, when resources for the PUSCH at least partially overlap with resources for a physical downlink shared channel (PDSCH) for a second UE scheduled by the network entity; and
  - receive, from the first UE, the PUSCH with the UCI multiplexed on a subset of the resources for the PUSCH that are non-overlapping with the resources for the scheduled PDSCH, wherein the UCI is excluded from being multiplexed on resources for the PUSCH that overlap with the resources for the scheduled PDSCH.

13. The apparatus of claim 12, wherein the PUSCH comprises a configured grant (CG) PUSCH or a dynamically scheduled PUSCH.

14. The apparatus of claim 12, wherein the PDSCH comprises a semi-persistently scheduled (SPS) PDSCH or a dynamically scheduled PDSCH.

15. The apparatus of claim 12, wherein:
- the PDSCH comprises a semi-persistently scheduled (SPS) PDSCH; and
- the indication is transmitted in a previous SPS occasion.

16. The apparatus of claim 12, wherein the indication is transmitted via a downlink control information (DCI).

17. The apparatus of claim 16, wherein the DCI schedules the PUSCH.

18. The apparatus of claim 16, wherein the DCI comprises a non-scheduling DCI.

19. A method for wireless communications at a user equipment (UE), comprising:
- determining resources for multiplexing uplink control information (UCI) in a physical uplink shared channel (PUSCH) when resources for the PUSCH at least partially overlap with resources for a scheduled physical downlink shared channel (PDSCH); and
- transmitting the PUSCH with the UCI multiplexed on determined resources comprising a subset of the resources for the PUSCH that are non-overlapping with the resources for the scheduled PDSCH, wherein the determined resources exclude resources for the PUSCH that overlap with the resources for the scheduled PDSCH.

20. The method of claim 19, wherein:

the PDSCH is scheduled via a downlink control information (DCI) that indicates the resources for the PDSCH that overlap with the PUSCH; and the resources for multiplexing the UCI comprise one or more time uplink (UL) resources of the PUSCH that are non-overlapping with the PDSCH.

21. The method of claim 20, wherein the PDSCH comprises a PDSCH scheduled for the same UE as the PUSCH.

22. The method of claim 20, wherein the DCI comprises a group-common DCI that schedules the PDSCH for another UE.

23. The method of claim 19, wherein:

the PDSCH is intended for another UE; and the resources for multiplexing the UCI comprise one or more time uplink (UL) resources identified by an indication from a network entity that scheduled the PDSCH.

24. The method of claim 23, wherein:

the PDSCH comprises a semi-persistently scheduled (SPS) PDSCH; and the indication is provided in a previous SPS occasion.

* * * * *